United States Patent [19]

Mellor

[11] 4,382,804

[45] May 10, 1983

[54] FLUID/PARTICLE SEPARATOR UNIT AND METHOD FOR SEPARATING PARTICLES FROM A FLOWING FLUID

[76] Inventor: Fred Mellor, 57 Sandringham Rd., Dalston, London E8 2LR, England

[21] Appl. No.: 239,530

[22] Filed: Mar. 2, 1981

Related U.S. Application Data

[63] Continuation-in-part of Ser. No. 15,045, Feb. 26, 1979, abandoned.

[30] Foreign Application Priority Data

Feb. 26, 1978 [GB] United Kingdom ............... 7828/78

[51] Int. Cl.³ ............................................. B01D 45/14
[52] U.S. Cl. ............................................. 55/1; 55/400; 55/414; 55/DIG. 3; 210/512.3; 210/787; 209/144; 15/353
[58] Field of Search .................. 55/338, 339, 396, 398, 55/400, 406–409, 422, DIG. 3, 1, 401, 403, 404, 405, 202, 205, 414, 416, 402; 210/512.3, 787; 209/143, 144; 15/353

[56] References Cited

U.S. PATENT DOCUMENTS

| | | | |
|---|---|---|---|
| 1,360,929 | 11/1920 | Gough | 55/409 |
| 2,143,144 | 1/1939 | Fagerberg | 55/472 |
| 2,269,142 | 1/1942 | Sturtevant | 55/400 |
| 2,357,734 | 9/1944 | Haber | 55/338 |
| 2,374,238 | 4/1945 | Schneible et al. | 55/407 |
| 2,453,593 | 11/1948 | Putney | 55/398 |
| 2,653,016 | 9/1953 | Lofton et al. | 55/408 |
| 3,217,976 | 11/1965 | Downs | 55/406 |
| 3,260,039 | 7/1966 | Brown et al. | 55/403 |
| 4,173,458 | 11/1979 | Stiles | 55/405 |

FOREIGN PATENT DOCUMENTS

| | | | |
|---|---|---|---|
| 4145 | 9/1979 | European Pat. Off. | 55/DIG. 3 |
| 331053 | 7/1929 | Fed. Rep. of Germany | |
| 906402 | 1/1954 | Fed. Rep. of Germany | |
| 643441 | 9/1928 | France | |
| 1053943 | 2/1954 | France | |
| 1153288 | 3/1958 | France | |
| 296327 | 2/1954 | Switzerland | |
| 134960 | of 1911 | United Kingdom | 55/472 |
| 120812 | 6/1959 | U.S.S.R. | 55/400 |
| 363507 | 11/1973 | U.S.S.R. | 55/400 |

Primary Examiner—David L. Lacey
Attorney, Agent, or Firm—Thomas J. Greer, Jr.

[57] ABSTRACT

A fluid/particle separator assembly includes an apertured rotary separator mounted substantially to close an inlet to a chamber through which a fluid is forced by a pump or impeller. The separator is rotated at such a speed that inclined faces bounding its apertures, and facing in the circumferential direction of motion, occlude direct flow through the separator; particles in the flow rebound from the separator to remain on its inlet side while the cleansed fluid passes through the rotor, is centrifuged outwardly and ducted by baffles in the chamber to an outlet. A method of separating particles from a flowing fluid by means of said rotary separator is also disclosed.

16 Claims, 9 Drawing Figures

FLUID/PARTICLE SEPARATOR UNIT AND METHOD FOR SEPARATING PARTICLES FROM A FLOWING FLUID

This application is a continuation-in-part of application Ser. No. 15,045 filed Feb. 26,1979, now abandoned.

BACKGROUND OF THE INVENTION

The present invention relates to a fluid/particle separator unit for separating particles from a fluid flow and to a suction cleaner fitted with such a separator unit.

Many types of fluid/particle separators are in use in industry and in domestic apparatus for various purposes, perhaps the simplest being the filter. The common industrial suction cleaner, for example, employs motor-driven impellers to draw air through a hose, the free end of which can be placed on or near a surface to be cleaned, into a container provided with a filter. Sufficient working air flow must be developed by the impellers to draw in dust and grit together with the air, the dust and grit being trapped by the filter and retained in the container, while the cleansed air is expelled to the atmosphere.

After some time the container inevitably becomes filled with dirt and this must be emptied out before cleaning is continued. It has been found, however, that the filter can become clogged with dust even before the container is full, so that the working air flow developed by the impeller gradually falls off and the cleaner no longer cleans efficiently. In fact, when used to collect extremely fine dust, such as talc or the dust generated by the masonry cutting tool described in U.K. Pat. No. 1105308, the filters of even powerful industrial vacuum cleaners can become clogged after as little as 30 seconds of use.

All types of filters used in a multiple of other instruments and industrial plants from air conditioning units to chemical separators, suffer from this same disadvantage of clogging and require cleaning or replacement at regular intervals. Alternative separators, such as centrifuges and electrostatic separators, are far more costly and, like filters themselves, are not suitable for all purposes.

An object of the present invention is to provide a separator unit for use in many of the fields of fluid/particle separation in which filters and other apparatus are currently employed, which is relatively inexpensive to produce and which will achieve efficient, continuous separation of fine particles from a fluid even after prolonged periods of use.

SUMMARY OF THE INVENTION

According to one aspect of the invention there is provided a fluid/particle separator assembly for separating particles from a flow of fluid, said assembly comprising in combination:
(a) a rotary separator having apertures bounded, at least in part, by surfaces inclined to the axis of said separator and facing in a circumferential direction with respect to said separator;
(b) rotor drive means for rotating said rotary separator, in use of said assembly, in a sense to move said surfaces in said circumferential direction;
(c) mounting means for mounting said fluid/particle separator assembly in said flow of particle-containing fluid with said surfaces facing upstream of said flow;
(d) whereby, in use of said assembly, particles in said flow rebound from said separator and remain upstream thereof with respect to the direction of said fluid flow and fluid containing a substantially reduced concentration of particles passes through said apertures and is centrifuged outwardly by the inclined separator surfaces.

It is found that efficient separation of particles from a fluid flow can be achieved with the assembly described above by suitable choice of the rotary separator and rotational speed for a particular rate of the fluid flow.

In practice, the rotary separator of the invention must be located across an inlet to a duct confining a fluid flow with the inlet side of the rotary separator facing the flow and separated from its opposite, outlet side, so that the particles separated from the flow are trapped on the inlet side and may be collected while cleansed fluid may be collected from the outlet side of the separator. This separation of the particles from the cleansed fluid may be achieved either by providing a housing for the separator as part of the assembly or by providing mounting means for mounting the separator assembly in a conduit carrying the fluid flow, the rotary separator substantially closing the conduit so that the entire flow is constrained to pass through it; such an assembly would, for example, by useful in an air conditioning system for separating dust or noxious particles from the air.

The separator assembly preferably also includes flow-directing baffle means adjacent and coaxial with the rotary separator, on its outlet side, for example, for directing the cleansed fluid flow to an outlet of the housing or duct.

In a separator assembly provided with its own housing, this latter preferably comprises or includes an annular wall coaxial with the rotary separator, and with the baffle means, the separator being located such that it substantially closes a circular inlet defined by the wall. The outlet from the housing may be provided through a peripheral aperture or apertures or may comprise an axial opening.

The action of a separator assembly of the invention is as follows:

A fluid flow, driven by external means, such as a pump or impeller, is constrained by the conduit or housing to pass through the rotary separator and is subjected to a centrifuging action by the inclined surfaces thereof;

the fluid is thus deflected from a straight path as it passes through the apertures in the separator. It is found that particles entrained in the fluid flow are separated therefrom on the inlet side of the separator; it is thought that this is due to the particles, having greater inertia, impinging on the separator surfaces, including the inclined surfaces bounding the apertures, and rebounding, as will be explained more fully below. The fluid passing through the rotary separator is thus substantially cleansed of particles.

In accordance with the above theory, the apertures and inclined surfaces of the separator, and its speed of rotation should preferably be such as to occlude direct passage through the separator, parallel to its axis of rotation, in the time taken for the fluid to travel through the separator. The apertures and inclined surfaces should also be so arranged that particles impinging on the inclined surfaces rebound into the space on the inlet side of the separator and not to the outlet side or to a surface facing the outlet side. The actual configuration of the rotary separator, and particularly of its apertures and inclined surfaces, can vary widely and depends on the intended speed of rotation of the separator and on the fluid flow rate for a particular use.

The baffle means of the separator assembly may be arranged to facilitate, and possible enhance, the radially-outward flow of the fluid produced by the apertured separator. The baffle means may, for example, include a plate arranged parallel to the plane of rotation of the separator to define, with the separator, a duct for the radially outward flow. Such a plate may be static, in use, possibly being fixed to the assembly housing, but is preferably carried by a drive-shaft for the rotary separator for rotation therewith: in this latter case, the rotary plate would enhance the radial flow.

The radial flow may be further enhanced by the provision of baffle means in the form of a rotary, centrifugal impeller. This may, for example, comprise impeller blades fixed to the rotary-separator drive shaft, or to the rotary separator itself. In one preferred embodiment of the invention, impeller blades are each fixed along one edge to the rotary separator and along an opposite edge to a baffle plate arranged parallel to the plane of rotation of the separator.

The rotation of a suitable impeller/separator combination in a fluid itself creates a radially-outward fluid flow, which can induce a flow through the apertures of the separator into the impeller, particles being separated from the flow on the inlet side of the separator. Accordingly the invention further provides a fluid/particle separator assembly comprising a centrifugal impeller and an apertured rotary separator mounted coaxially and adjacent each other on a common drive shaft for connection to a drive for rotating the impeller in a fluid so as to expel fluid centrifugally from its periphery and induce a fluid flow through the separator towards the impeller, the apertures of the separator being bounded, at least in part, by surfaces inclined to the axis of the separator, said surfaces also facing away from the impeller and in the direction of circumferential motion thereof when the impeller is rotated to create the said fluid flow, the action of the separator separating particles from the fluid flow.

Although the above impeller/separator combination itself creates a fluid flow it is preferably used in a greater flow created by other means, the impeller being arranged to assist this flow. The fluid flow may, for example, by created by any suitable pump or impeller located upstream or downstream of the rotary separator.

The rotary separator of the invention has apertures bounded by inclined surfaces. The apertures are preferably elongate and may extend radially or be inclined at up to about 45° to the radius, in a leading, or preferably a trailing sense with respect to the circumferential direction of motion of the separator in use. The apertures may extend to the circumference of the separator and may be defined by a plurality of relatively thin vanes providing the said surfaces but, in preferred embodiments of the invention, the apertures are formed in a separator disc. For reasons of strength and, in some embodiments, to provide circumferential sealing as will be described below, the disc may have a solid, that is unapertured, peripheral portion.

The inclined surfaces bounding the apertures preferably comprise surfaces of vanes extending along, or adjacent, a longitudinal edge of each aperture and projecting from that surface of the disc adjacent the baffle means. Such vanes are suitably inclined to the plane of the disc at an angle of from substantially 10° to 75°, preferably 25° to 45°, depending on the intended speed of rotation of the disc and the configuration of the apertures.

As mentioned above, a housing of the separator assembly of the invention should include an annular wall defining a circular inlet opening, the rotary separator being located across the inlet. The separator may be of larger diameter than the inlet and axially spaced from the said annular wall which may be generally cylindrical, frusto-conical, or radial: an additional annular skirt or flange of the housing may surround the separator. Alternatively, the separator may be of smaller diameter than the inlet defined by an axially extending, preferably cylindrical wall, and separated therefrom by a small radial clearance. In each case any baffle means are located within the housing.

The annular clearance between a rotary separator and the wall defining the inlet may be sealed by a suitable seal, for example, of the brush or labyrinth type to prevent particle-laden fluid from leaking past the periphery of the separator to contaminate the cleansed fluid which has passed through the separator, in use. In a preferred embodiment of the invention, however, the peripheral clearance, the rotary separator, the housing and the baffle means are so dimensioned and arranged that cleansed fluid centrifuged by the separator is forced through the clearance from the outlet to the inlet side of the separator preventing a flow of particle-laden fluid in the opposite direction.

The cleansed fluid which passes through the rotary separator and is collected from the periphery thereof may be ducted through peripheral outlets of the housing but, particularly when the separator assembly is to be located upstream of a pump or impeller for creating the fluid flow, an axial outlet to the pump or impeller is preferably provided on the opposite side of the rotary separator from the inlet. In such an arrangement, sufficient space is provided between the periphery of baffle means located in the housing and the housing itself to allow unrestricted flow of the fluid passing through the separator over the baffle means. The baffle means are preferably also arranged, for example by the provision of radial stator blades, to direct the flow radially-inwardly from the peripheral space to the outlet. The baffle means may be of larger or smaller diameter than the separator depending on the configuration of the housing.

Any suitable independent drive, such as an electric motor, may be provided for rotating the rotary separator but, when convenient, the separator may be mounted on an extension drive shaft adapted to be connected to the main drive shaft of a motor or of an impeller which induces the fluid flow, in use: in such a case the assembly housing would be adapted for mounting on or within the impeller casing with the outlet from the assembly connected to the impeller inlet. It will be appreciated that, in use of such apparatus, particles separated from the fluid flow induced by the impeller will remain outside the impeller casing. If desired, these particles may be collected in a container through which the particle-laden fluid is drawn to the impeller inlet, as in the case of apparatus adapted for use with a suction cleaner. Alternatively the rotary separator may simply be provided in place of a filter, for example to protect an air-cooled motor and/or an impeller from damage by dust particles in the induced air flow.

In any such apparatus the rotary separator of the invention does not, unlike a filter, become clogged by the particles separated and require frequent replacement, nor does it cause the working flow created by the impeller to fall off rapidly with use.

According to a further aspect of the invention there is provided a fluid/particle separator unit for separating particles from a flow of particle-containing fluid, comprising, in combination: a housing defining a chamber and a fluid inlet to said chamber and a fluid outlet from said chamber; means, such as a motor/impeller assembly connected to the outlet, for creating a flow of fluid from said fluid inlet to said fluid outlet across said chamber, in use; a rotary separator as described above cooperating with the inlet and arranged with its inclined surfaces facing outwardly of the chamber; and rotor drive means for rotating the rotary separator in use, so that the action thereof separates particles from the fluid, which particles remain outside the chamber, while fluid containing a substantially reduced concentration of particles leaves the chamber through the fluid outlet.

The invention also provides a suction cleaner comprising a container having an inlet opening for dust-laden air and a fluid particle separator unit as described above mounted on the container with the inlet thereto communicating with an outlet opening of the container, in use dust being trapped in the container and cleansed air being expelled from the container.

In a fluid/particle separator unit as described above it is found that, in order not to reduce the volume flow rate created by the impeller to an unacceptable extent, the sum of the flow cross-sections of the apertures in the separator should be at least equal to that of the smallest aperture through which the fluid flows to the impeller. In practice this means that the rotary separator, and hence the inlet defined by the annular wall, have a substantially larger diameter than the diameter of the opening, which is preferably axial, from the separator assembly to the impeller.

BRIEF DESCRIPTION OF THE DRAWINGS

Several embodiments of the invention will now be more particularly described, by way of example, with reference to the accompanying drawings in which.

DESCRIPTION OF THE PREFERRED EMBODIMENTS

Figure 1:
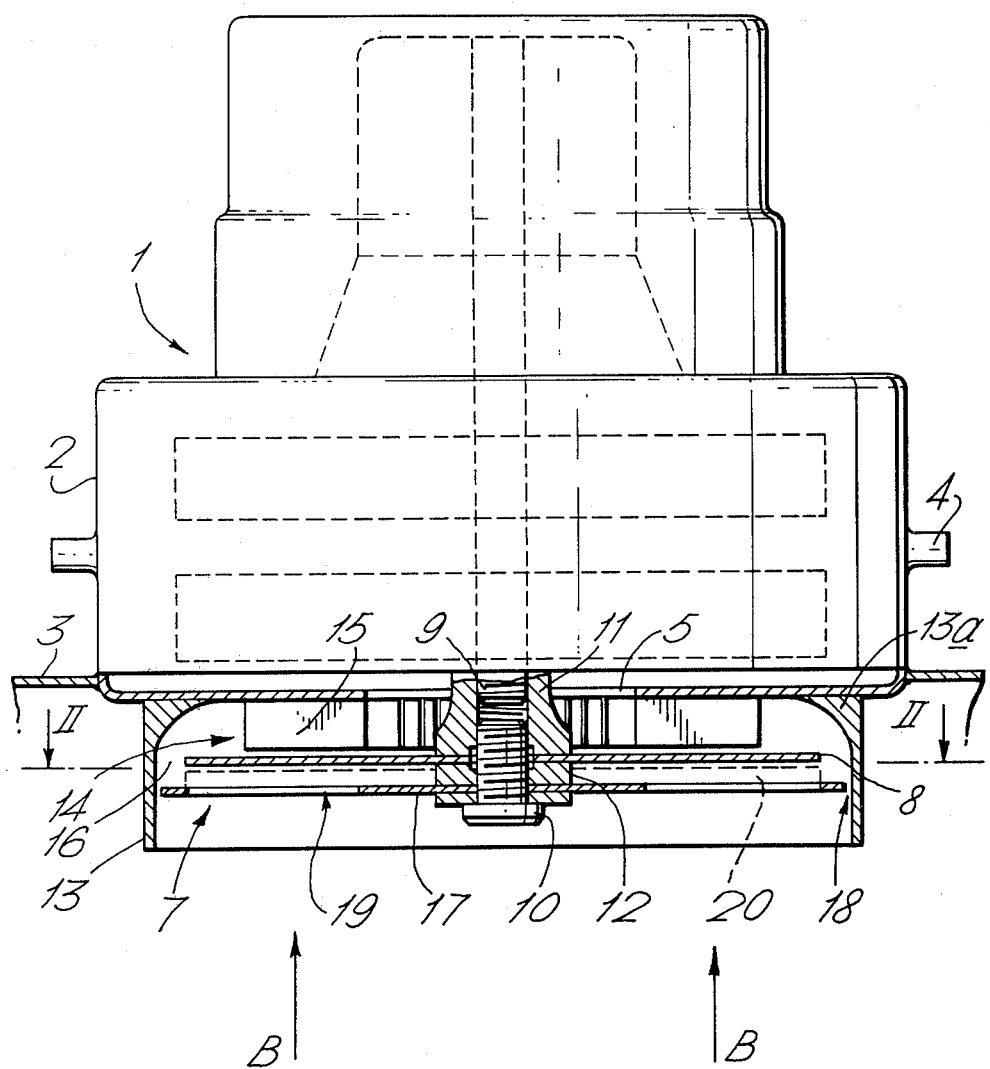
FIG. 1 is a schematic axial sectional view of a suction cleaner according to the invention.

Referring to FIG. 1 of the drawings, a suction cleaner according to the invention is shown generally indicated 1 including a motor/impeller assembly housed in a casing 2 mounted on the lid of a container 3. The cleaner is arranged such that, in use, the motor/impeller assembly exhausts air from the casing 2 through peripheral outlets 4, inducing an air flow into the casing 2 through an opening 5 communicating with the container 3, thus inducing a flow, which normally comprises dust-laden air, into the container 3 through an inlet 6. The impeller/motor assembly 1 and its arrangement on the container 3 are of known type and will not, therefore, be described further nor shown fully in the drawings.

The suction cleaner of FIG. 1 also includes a gas/particle separator assembly of the invention located across the inlet 5 for separating dust from the air flow to the motor/impeller assembly. The separator assembly includes a rotary separator generally indicated 7 and a rotary baffle plate 8 mounted for rotation, in the sense shown by arrow A in FIG. 2, with the drive shaft 9 of the motor/impeller assembly, the end of which projects coaxially through the opening 5. The separator 7 and the plate 8, in this embodiment, are in fact fixed by a bolt 10 to an internally screw-threaded extension drive shaft 11 screwed on to the end of the shaft 9 and are separated from each other by a washer 12, the plate 8 being closer to the opening 5 than the separator 7; the shaft 9 may, alternatively, be formed to receive the plate 8 and separator 7 directly.

The separator assembly further includes a generally cylindrical housing 13 coaxially surrounding the separator 7 and the baffle plate 8 and attached at its upper end to the lower wall of the motor/impeller assembly casing 2. A stator 14 is located between the baffle plate 8 and the casing 2 and provides a plurality of radially extending vanes 15 for ducting air from an annular peripheral space 16 between the baffle plate 8, the separator 7 and the housing 13 inwardly to the axial opening 5; a portion 13a of the internal wall of the housing 13 surrounding the stator 14 is also shaped to assist the air flow to the opening 5.

Figure 2:
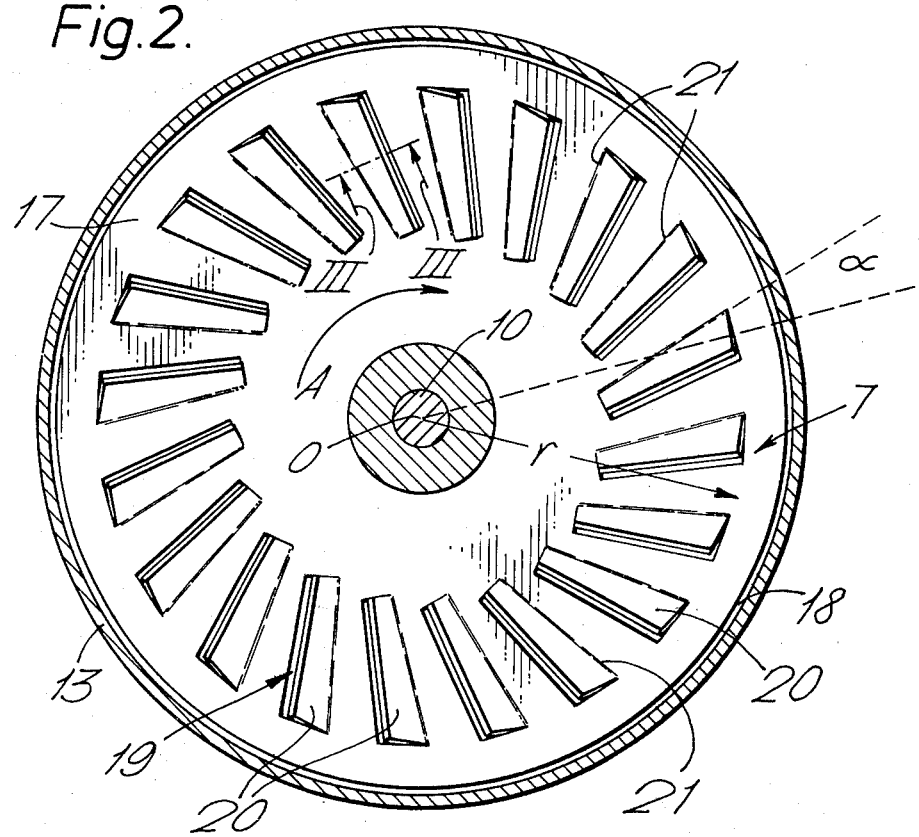
FIG. 2 is a sectional view taken on line II—II of FIG. 1.
Figure 3:
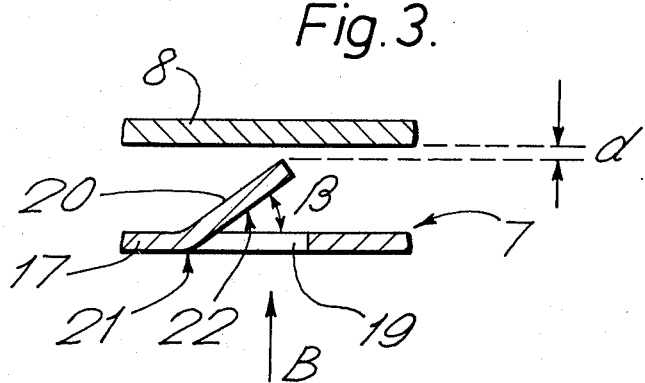
FIG. 3 is a sectional view, on an enlarged scale, taken on line III—III of FIG. 2, showing part of the separator assembly of the suction cleaner.

Referring to FIGS. 2 and 3 of the drawings, the rotary separator 7 is shown in greater detail. The separator 7 comprises a disc 17 of substantially the same diameter (12 cm) as the internal wall of the housing 13, but separated therefrom by a small radial clearance 18, ½ mm in width. The disc 17 is formed with a plurality of similar, radially-elongate, equiangularly-spaced apertures 19 and vanes 20, the apertures 19 being formed by punching the vanes 20 from the disc such that each vane is attached to the disc along a longitudinal edge 21 comprising the trailing edge of the respective aperture with respect to the sense of rotation A. The vanes 20 are planar and inclined at an angle $\beta$ to the plane of the disc 17, the longitudinal edges 21 of the apertures 19 being inclined at an angle $\alpha$ to the radius of the disc through their midpoints. The vanes 20 project from the disc 19 towards the baffle plate 8, as shown in FIG. 3 and schematically in FIG. 1, the free edges of the vanes being spaced from the baffle plate 8 by a small distance d and the outer edges of the vanes 20 and apertures 19 lying on a circle of substantially the same radius r as the baffle plate 8.

The vanes 20 thus present inclined surfaces 22 which face circumferentially and away from the baffle plate 8.

The values of d, r, α and β, the number, size and shape of the apertures 19 and of the vanes 20 and their spacing from the center 0 of the disc 17 may be varied to vary the separation achieved by the rotary separator 7 but, in the embodiment of FIGS. 1 to 3, these factors have the following values:

| No. of apertures | 20 |
|---|---|
| Shape of apertures | slightly tapered, widening to outer, generally-tangential edge |
| Approx. area of each aperture | 1 sq. cm |
| Distance of midpoint of trailing edge from centre O | 4.5 cm |
| α | 12° |
| β | 35° |
| d | 1 mm |
| r | 5.7 cm |

The operation of the suction cleaner described above is as follows: the cleaner is arranged so that activation of the motor/impeller assembly causes dust-laden air to be drawn into the container 3 through the inlet 6.

Within the container 3 the air flow induced by the impeller flows upwardly in the direction of the arrow B towards the lower, inlet end of the housing 13 and encounters the rotary separator 7 rotated by the motor drive shaft 9. The separator 7 is so formed that it prevents substantially all the dust particles in the air flow from passing through it, as will be explained below, while allowing the air to flow through the apertures 19. In passing through the apertures 19 the air flow is subjected to a centrifuging action by the vanes 20, enhanced by the rotation of the baffle plate 8, so that it is centrifuged radially-outwardly between the separator 7 and the plate 8 into the peripheral space 16.

It will be appreciated that this radially-outward flow of air causes a region of higher pressure to be built up within the space 16, the dimensions and configuration of the separator assembly being such that this high pressure region causes air to escape outwardly from the housing 13 through the radial clearance 18 between the disc 17 and the housing 13, thus preventing dust-laden air from leaking through this clearance in the opposite direction.

Most of the air centrifuged into the space 16 is drawn over the periphery of the plate 8 and inwardly between the vanes 15 of the stator 14 to the opening 5 to the motor/impeller assembly 1. Cleansed air is finally exhausted by the impeller assembly through the outlets 4.

Separating action

Figure 8:
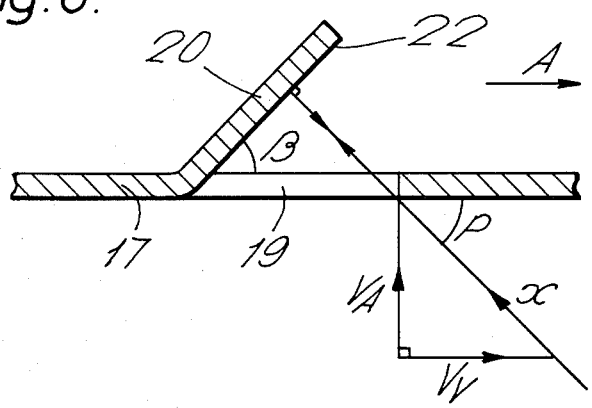
FIG. 8 is a schematic diagram of a particle impinging on a rotary separator forming part of the apparatus of FIGS. 1 to 3.

It is believed that the main separating action of the separator assembly may be represented by the following approximation, based on a rotary separator 7 for which α=0°, and made with reference to FIG. 8: Air is drawn towards the separator assembly in the direction of arrow B at a velocity $V_A$ and encounters the rotating, vaned disc 17. The air can be considered as approaching a point on a vane 20 which has a tangential speed $V_V$, at a relative speed x, given by the equation:

$$x = \sqrt{V_A^2 + V_V^2},$$

at an angle ρ to the plane of the disc given by: $\tan \rho = V_A/V_V$

The apertures 19 and the vanes 20 are so formed that at this relative speed x and angle ρ of approach, the air cannot pass through the apertures without changing direction. The air is therefore diverted from a straight line path to pass through the apertures 19 while the heavier dust particles entrained in the air flow, because of their greater inertia, continue substantially in straight lines to the separator 7 and rebound either from the flat lower face of the disc 17 or from the surfaces 22 of the vanes 20. The inclination of the surfaces 22 is such that the particles rebound back into the container 3.

FIG. 8 also shows the maximum angle β of a vane 20 at which all the particles hitting it will rebound into the container 3, the relative speed and direction of approach of a particle to the vane being represented by x. At this angle, each particle rebounds from a vane along the path at which it is incident on the vane, i.e. in actuality, approximately perpendicular to the plane of the disc 17: if β is greater than the maximum angle shown, the particles will rebound from the vanes 20 towards the plate 8, i.e. will remain in the air flow passing through the separator 7.

From FIG. 8 it is seen that:

$$\beta_{max} = 90° - \rho$$

$$\beta_{max} = 90° - \tan^{-1} V_A/V_V$$

As shown above, the maximum value of β for a particular disc depends both on the velocity $V_A$ of the air flow in which the disc is to be used and on the speed of rotation of the disc itself: β also depends on the value of α for apertures inclined to the radius.

The velocity $V_A$ of the air flow depends on the power of the motor/impeller assembly as well as on the configuration of the separator assembly and since the motor also rotates the separator, the values of $V_A$ and $V_V$ are linked.

It is found, in practice, that it is not normally possible to incline the vanes at angles near the maximum value of β given by the above equation as, at such large angles, lighter particles remain entrained in the flow passing through the apertures. Relatively large β angles are, however, desirable if the air flow is not to be restricted to too great an extent: a large overall through-flow is important if the suction cleaner is to be efficient at collecting dust from surfaces, in use, and, for this reason, the apertures and vanes of the separator plate should offer no substantially greater restriction to the air flow than that offered by the smallest aperture between the suction cleaner hose (not shown) and the impeller, in this case the opening 5. The area of the peripheral space 16 between the baffle plate 8 and the housing 13 should not be less than the area of the opening 5 for the same reason.

The area available for the air flow through the separator 7 is given by the sum of the minimum areas ($A_{min}$) between the vanes and the leading edges of the apertures. As is seen from FIG. 8, $A_{min}$ can be calculated as follows:

$$A_{min} = A \sin \beta$$

where A is the area of each aperture in the plane of the separator plate. In the embodiment described above having 20 apertures each approximately 1 cm² in area and a value of β of 35°, the total area for the air flow is approximately 11½ cm² which is slightly larger than the area of the opening 5 which is approximately 10 cm². Although with the apparatus described a value of β of approximately 35° has been found to be the optimum, good results are achieved with values of $\beta$ between 30° and 40°.

It being understood that the minimum apertured area of the separator plate, as calculated above, does not fall below the critical minimum, a change in this area will result in a change in the speed of the air flow through the plate and, it is found, a change in the separating efficiency of the plate. Thus, a reduction in this area increases the air speed and, in general, decreases the separating efficiency, where, by separating efficiency, is meant the percentage of particles in a particular size range separated from the air flow.

The spacing between the baffle plate 8 and the separator 7 also affects the air flow and can be used to control both the separating efficiency and the 'air-sealing' effect generated around the periphery of the separator disc 17. More particularly, a decrease in this spacing causes a decrease in the volume through-flow of air, an increase in the separating efficiency and an improvement in the air-sealing effect. It is found that generally good results are given with the baffle plate almost touching the separator vanes, the separator disc and baffle plate being approximately 4 mm apart in the embodiment shown.

The above is given solely as a theoretical explanation of the operation of the separator assembly described and of the various factors which are found to affect its separating efficiency. In practice, in use of the suction cleaner 1 with a B.V.G. LH 2 motor/impeller assembly comprising a 700 watt motor and a two-stage exhaust turbine, which can induce a volumetric through flow of air of the order of 2.7 m$^3$/min without the separator assembly, the air flow is reduced by approximately 27% with the separator assembly added. This is approximately the same reduction as found with a filter in the initial stages of use, before it has become clogged. The separator assembly is able to prevent the passage of fine flour into the impeller assembly, the flour remaining in the container 3 and cleansed air being expelled through the outlets 4, the air flow rate remains substantially unchanged until the container 3 is nearly full.

Figure 4:
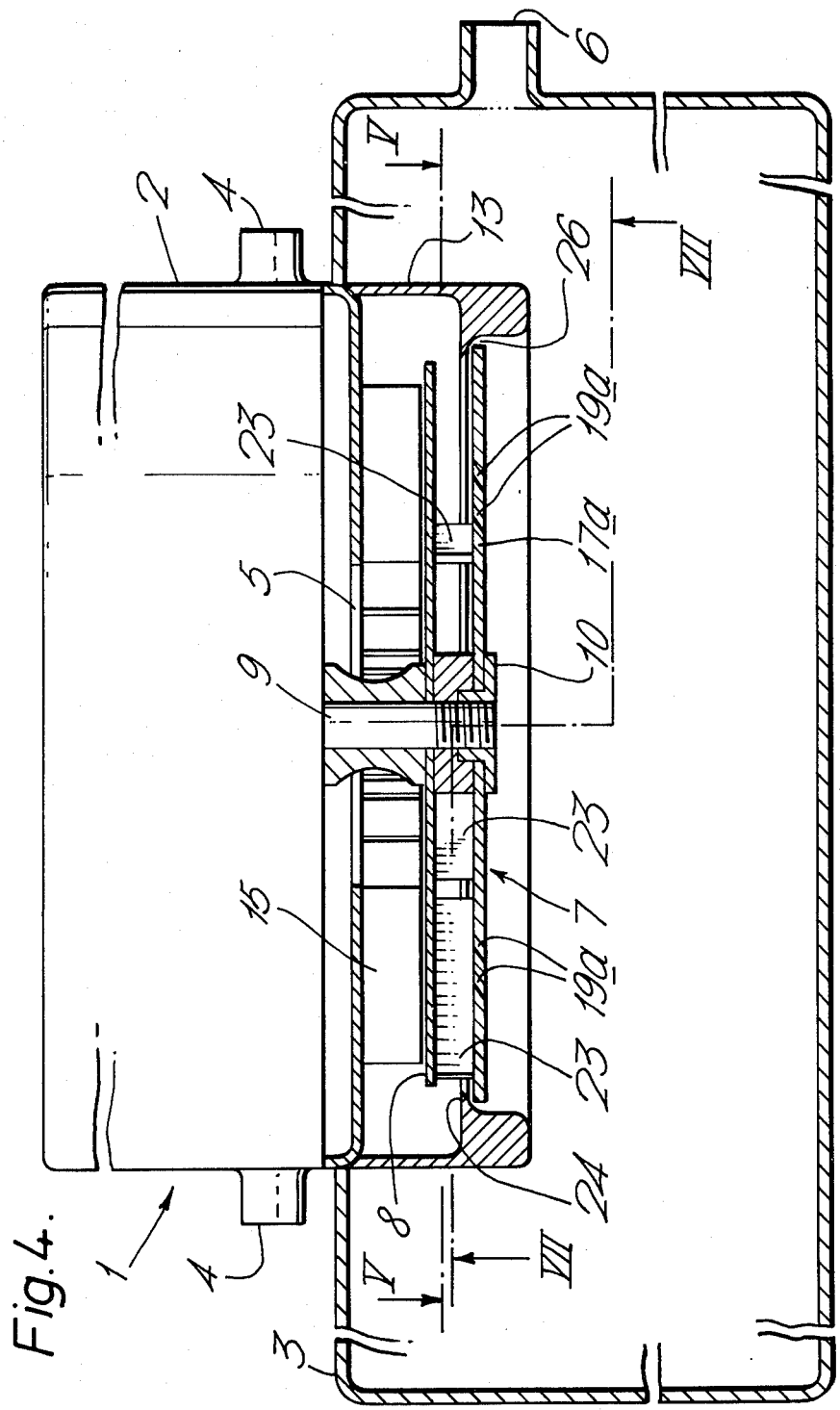
FIG. 4 is a schematic axial sectional view similar to FIG. 1 of a second embodiment of my invention.
Figure 5:
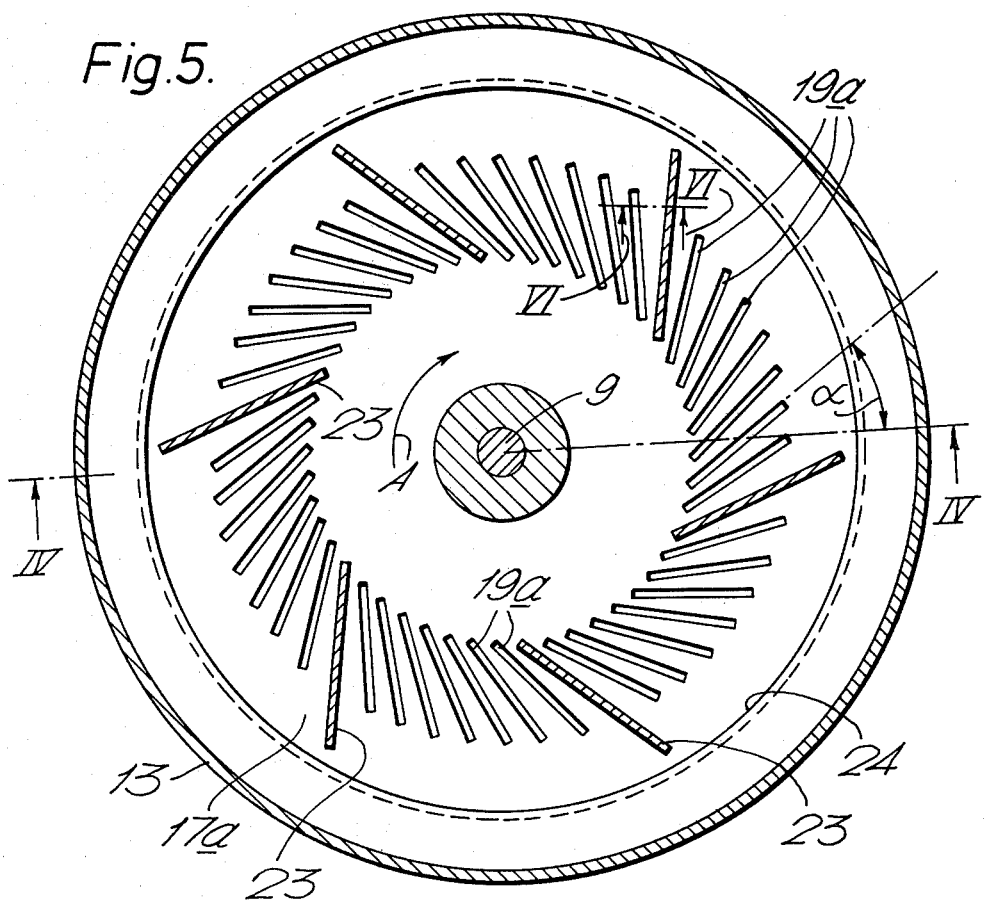
FIG. 5 is a sectional view taken on the line V—V of FIG. 4.
Figure 6:
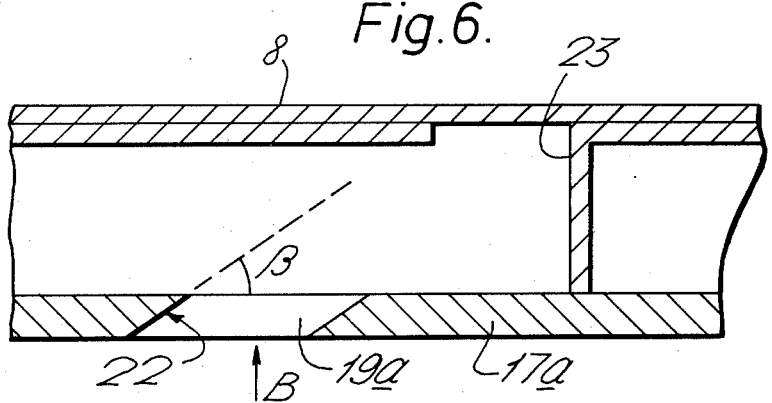
FIG. 6 is a sectional view, on an enlarged scale, taken on line VI—VI of FIG. 5 showing part of the assembly of the suction cleaner.

Referring to FIGS. 4 to 7 and 9 of the drawings, further embodiments of a suction cleaner and a separator assembly are shown in which parts similar to those of FIGS. 1 to 3 are referenced by the same numerals and will not be described in detail. In the embodiment of FIGS. 4 to 6 which is the invention of another, the vaned, apertured rotary separator disc 17 of the first embodiment is replaced by a thicker, slotted disc 17a, without the vanes 20 but with inclined separating surfaces 22 formed in the thickness of the disc itself: the disc is approximately 3 mm thick. There are 42 generally rectangular slots 19a, the angles $\alpha$ and $\beta$ being the same as in the embodiment of FIGS. 1 to 3.

Referring to FIGS. 4 and 5, there are two major differences between the embodiment shown in these drawing and that FIGS. 1-3: impeller blades 23 are provided between the separator disc 17a and the baffle plate 8 and the housing 13 is of larger diameter than the housing 13 of FIG. 1 and is formed with an inwardly-projecting, annular flange 24 adjacent its lower, free end.

The annular flange 24 defines an inlet opening to the housing 13, the separator disc 17a being located below the opening and radially surrounded by a thickened wall of the housing with the baffle plate 8 above the opening. A small axial clearance 26 separates the disc 17a from the flange 24. This may be sealed by, for example, a brush seal, or the configuration of the housing, plate 8 and disc 17a may be such that cleansed air is blown out through this clearance, in use, as in the previous embodiment.

The impeller blades 23 are flat, lie in planes parallel to the axis of the rotor and are attached at respective upper and lower edges to the plate 8 and to the disc 17a. They are also inclined at substantially the same angle $\alpha$ to the radius through their midpoints as the slots 19a and the edges 21 of FIG. 2, are equiangularly spaced around the plate 8 and are each located between two adjacent slots 19a.

The blades 23 serve to promote the centrifugal air flow between the disc 17a and the plate 8, in use, and act in the same sense as the impellers of the motor/impeller assembly, thus assisting the air flow through the suction cleaner in general. It may be noted that the blades 3 terminate at their radially inner ends adjacent the inner ends of the slots 19a since, unlike common centrifugal impellers which draw air from their centers, the impeller constituted by the blades 23 receives air through the annulus of slots 19a.

Figure 7:
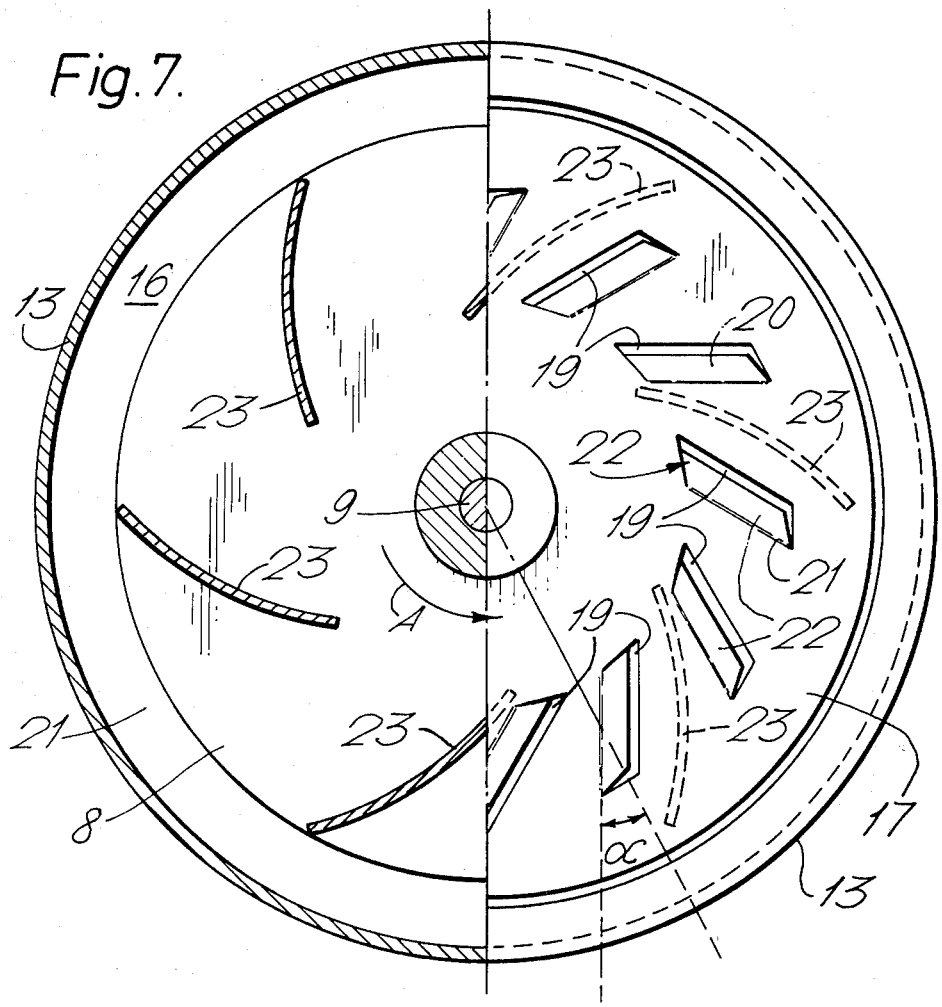
FIG. 7 is a horizontal sectional view of another embodiment of my separator assembly as it would appear if taken in a view similar to FIG. 4 along a section line similar to VII—VII of FIG. 4.

Referring to FIG. 7 of the drawings, another embodiment of my combined rotary separator 7 and baffle plate 8 for use in the separator assembly of FIG. 1 is shown. This embodiment essentially combines elements of the two embodiments described above in that the separator disc 17 has apertures 19 and upstanding vanes 20 similar to those of the disc of FIGS. 1 to 3 but impeller blades 23 are provided between the disc 7 and the plate 8 as in the embodiment of FIGS. 4 to 6. In this embodiment the blades 23 are curved and located each between two adjacent vanes 20, as shown in the drawings.

Figure 9:
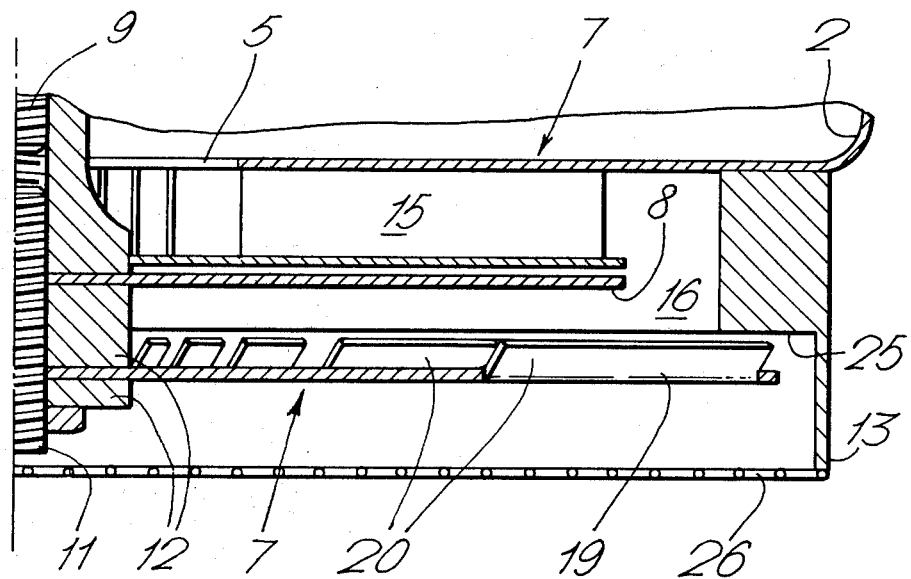
FIG. 9 is an axial sectional view, on an enlarged scale, of part of a suction cleaner according to third embodiment of my invention.

Referring to FIG. 9 of the drawings, part of a third embodiment of my invention is shown. In this embodiment the rotary separator disc 17 has 40 apertures 19 each bounded by an upstanding vane 20 which projects towards a flat baffle plate as in the embodiment of FIGS. 1 to 3, no impeller blades 23 being provided. The apertures 19 and vanes 20 extend to within 2.5 mm of the edge of the disc 17 and the extreme outer edges of the vanes 20 are axially spaced from an inwardly-projecting, annular shoulder 25 of the housing 13. The baffle plate 8 and stator blades 15 in this embodiment are of considerably smaller diameter than the separator disc 17 to provide adequate space for the air flow, in use, between the periphery of the plate 8 and the surrounding wall of the housing 13.

The operation of this embodiment is substantially the same as that of the embodiment of FIGS. 1 to 3 except that a far larger air flow escapes through the clearance 18 between the disc 17 and the housing 13, improving the 'sealing' against an inflow of dust-laden air around the periphery of the disc 17. This escaping air flow comes mainly from the radially outer portions of the apertures 19 facing the shoulder 25, the air flow through the remaining parts of the apertures being centrifuged into the annular space 16 between the disc 17, the periphery of the baffle plate 8 and the housing 13 to be ducted inwardly by the stator 14 to the opening 5.

The increased air flow through the clearance 18 has two additional effects. Firstly, it has the disadvantage of reducing the overall through-flow of air through the suction cleaner compared with the first embodiment described above but it has the beneficial effect of carrying particles floating in the air in the container 3 downwardly to settle and compact on the bottom of the container. This particular embodiment is also able to achieve better overall separation of finer particles than the embodiments of FIGS. 1 to 7.

A further feature of the suction cleaner shown in FIG. 9 is a mesh 26 covering the opening to the housing 13 for preventing large objects from hitting the separator 7 and possibly damaging it.

What is claimed is:

1. A fluid/particle separator assembly comprising in combination:
   (a) a centrifugal impeller mounted on a rotor drive shaft;
   (b) a rotary separator mounted coaxially on said drive shaft adjacent said impeller, said separator having apertures bounded, at least in part, by surfaces inclined to the axis of said separator and facing in a circumferential direction with respect to said separator and away from said centrifugal impeller;
   (c) drive means connected to rotate said drive shaft so that said impeller and said separator expels fluid centrifugally from the periphery of said impeller and induce a fluid flow through said separator towards said impeller and to move said surfaces of said separator in said circumferential direction, whereby the action of said separator separates particles from said fluid and fluid containing a substantially reduced concentration of particles is centrifuged outwardly by said impeller.

2. A method of separating particles from a flowing fluid wherein said flow is directed at an inlet side of a rotary separator having apertures bounded, at least in part, by surfaces inclined to the axis of said separator and being on an outlet side of said separator, and facing in a circumferential direction with respect to said separator and towards said flow, and said rotary separator is rotated in a sense to move said surfaces in said circumferential direction so as to occlude direct flow through said apertures; the relationship of said surfaces, the speed of rotation of the separator and the fluid flow rate being such that particles in said fluid rebound from said separator to the inlet side thereof, the fluid passing through said separator and being centrifuged by said surfaces.

3. A fluid/particle separator unit for separating particles from a flow of particle-containing fluid, comprising in combination:
   (a) a housing defining a chamber and including a circular fluid inlet to said chamber and a fluid outlet from said chamber,
   (b) means for creating said flow of fluid in the direction from said fluid inlet to said fluid outlet across said chamber, in use,
   (c) a rotary separator cooperating with said inlet and peripherally spaced from the housing by a clearance which is small compared with the diameter of the separator, said separator having apertures bounded at least in part by surfaces inclined to the axis of the rotor and facing upstream of said flow of fluid towards said inlet and in a circumferential direction with respect to said separator,
   (d) rotor drive means for rotating said rotary separator in a sense to move said surfaces in said circumferential direction,
   (e) whereby in use of said assembly, particles in the fluid flowing to the inlet rebound from the separator and remain outside said chamber and fluid containing a substantially reduced concentration of said particles passes through said apertures in said separator and is centrifuged by said inclined surfaces, a major part of said fluid containing a substantially reduced concentration of particles leaving said chamber through said outlet and a minor part thereof being forced through said clearance to prevent a flow of particle-laden fluid through the clearance into the chamber in use.

4. A fluid/particle separator unit as claimed in claim 3, wherein said means for creating said flow of fluid comprises a motor-impeller assembly positioned and arranged to exhaust fluid from said chamber through said fluid outlet.

5. A fluid/particle separator unit as claimed in claim 4, wherein said rotary drive means including a common drive shaft with said motor impeller assembly and said rotary separator mounted thereon for rotation thereby.

6. A fluid/particle separator assembly for separating particles from a flow of fluid said assembly comprising in combination:
   (a) a housing, said housing having an inlet for the flow of particle-containing fluid into said housing and an outlet aperture spaced from and positioned coaxial with said inlet for receiving said fluid containing a reduced concentration of the particles;
   (b) a rotary separator having apertures bounded, at least in part, by surfaces inclined to the axis of said separator and facing in a circumferential and axial direction with respect to said separator, said rotary separator substantially closing said inlet;
   (c) mounting means mounting said rotary separator within said housing in the path of said flow of particle-containing fluid with said surfaces facing upstream of said flow towards said inlet;
   (d) flow-directing baffle means mounted in said housing coaxially with said housing, said baffle means being positioned coaxial with and axially adjacent said rotary separator between said rotary separator and said outlet aperture and facing in the opposite axial direction from said inclined surfaces, said baffle means including a circular baffle plate separated from said housing by an annular space and being arranged to direct the fluid centrifuged by said rotary separator surfaces to said outlet aperture;
   (e) rotor drive means connected to said rotary separator for rotating said rotary separator to move said surfaces in said circumferential direction, whereby particles in said flow of fluid rebound from said rotary separator and remain upstream of said rotary separator with respect to the direction of said fluid flow and fluid containing a substantially reduced concentration of particles passes through said apertures and is centrifuged outwardly by the inclined separator surfaces.

7. A fluid/particle separator assembly as claimed in claim 6, wherein said outlet aperture is smaller than said inlet and further including a plurality of stator vanes fixed relative to said housing and defining between them radial ducts extending between said annular space and said outlet.

8. A fluid/particle separator assembly as claimed in claim 6, wherein said rotor drive means include a drive shaft and wherein said circular baffle plate is mounted on said drive shaft for rotation thereby.

9. A fluid/particle separator assembly as claimed in claim 6, wherein said baffle plate supports impeller blades connected to said drive shaft for rotation thereby, said impeller blades being arranged to enhance the centrifugal action of said separator, in use.

10. A fluid/particle separator assembly as claimed in claim 6, wherein said housing has an annular wall defining said inlet, said rotary separator is spaced from said annular wall by an annular clearance and wherein said rotary separator, said baffle plate and said housing are so arranged that fluid centrifuged by said rotary separator, in use, is expelled from said housing through said clearance to prevent the entry of particle-containing fluid therethrough.

11. A fluid/particle separator assembly as claimed in claim 6, wherein each said aperture of said rotary separator is elongate and is inclined at an angle of from 0° to substantially 45° to a radius through the center of a longitudinal edge thereof.

12. A fluid/particle separator assembly as claimed in claim 6, wherein said outlet aperture is smaller than said inlet and the sum of the flow cross-sections of said apertures of said rotary separator is of the same order of magnitude as the cross-section of said outlet aperture.

13. A fluid/particle separator assembly as claimed in claim 6, wherein said inclined surfaces bounding said apertures are inclined at an angle from 10° to 75° to a plane of the rotary separator perpendicular to its axis of rotation.

14. A fluid/particle separator assembly as claimed in claim 13, wherein said inclined surfaces bounding said apertures are inclined at an angle of from 25° to 45° to said plane.

15. A fluid/particle separator assembly as claimed in claim 6, wherein said rotary separator comprises a disc having formed therein said apertures and having vanes projecting therefrom to provide said inclined surfaces.

16. A suction cleaner comprising a container having inlet means and outlet means and a motor/impeller assembly arranged to withdraw air from said container through said outlet means, wherein said suction cleaner includes said fluid/particle separator assembly of claim 6 mounted within said container by said housing so that air withdrawn from said container through said outlet means, in use, is constrained to flow through said rotary separator, whereby particles separated by said rotary separator are trapped in said container and cleansed air passes through said separator to said outlet means.

* * * * *